Patented Mar. 6, 1928.

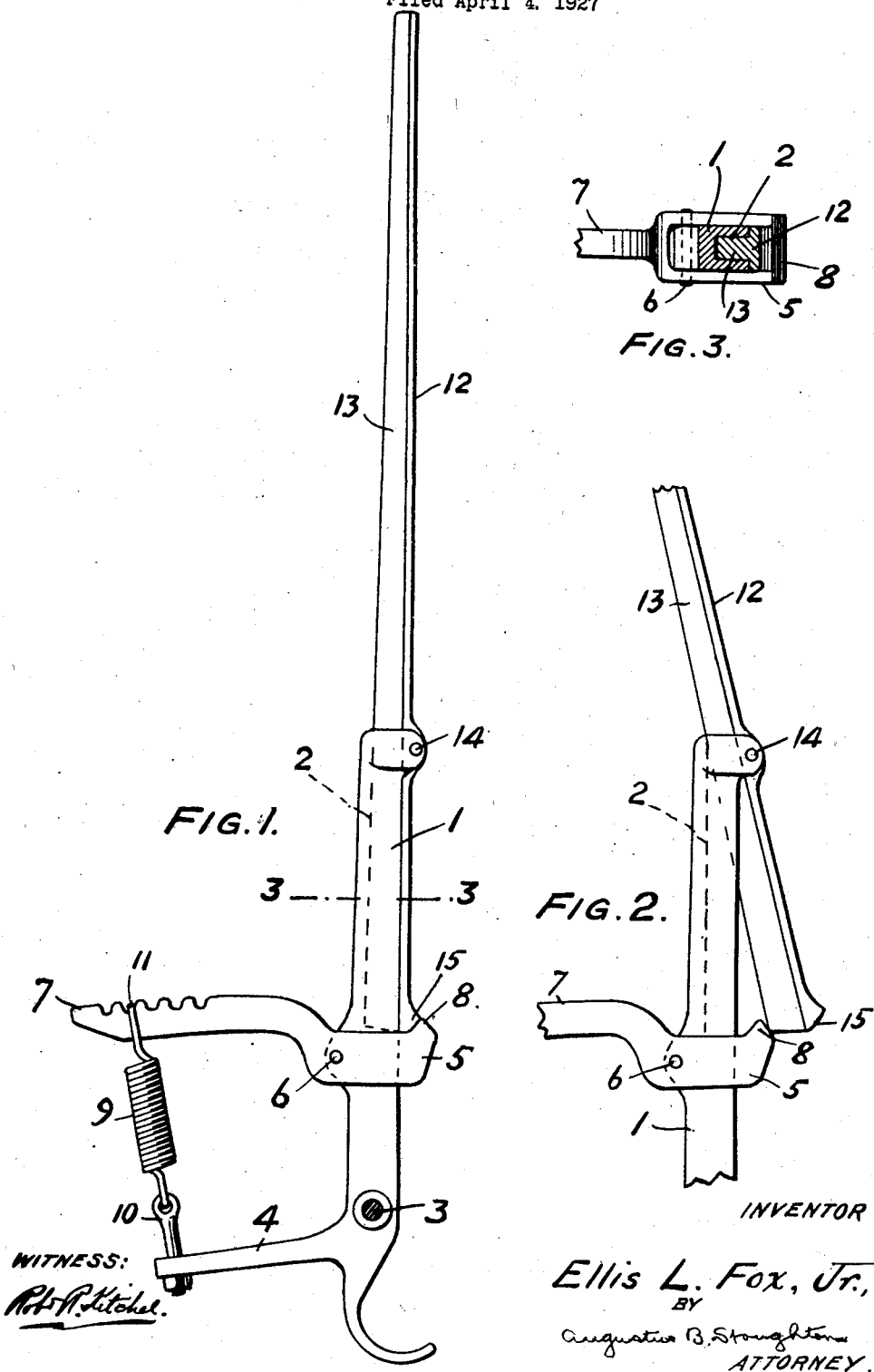

1,661,470

UNITED STATES PATENT OFFICE.

ELLIS L. FOX, JR., OF JEFFERSONVILLE, PENNSYLVANIA.

PICKER-STICK MECHANISM.

Application filed April 4, 1927. Serial No. 180,685.

The principal object of the present invention is to provide for replacing wooden picker sticks with metal picker arms or rods having release provisions and by which the advantages of durability, efficiency and economy are attained.

Other objects of the invention will appear from the following description at the end of which the invention will be claimed. The invention may be said to consist of a picker stick mechanism comprising a grooved metal shank oscillatable about a fixed axis and provided with a bracket, a catch pivoted to the shank and having a beveled nose and a projecting lever, a spring interposed between the lever and bracket, and a tongued metal picker arm pivotally connected with the free end of the shank and having a beveled heel adapted to be caught by the catch and to release the catch.

The invention also comprises the improvements to be presently described and finally claimed.

In the following description reference will be made to the accompanying drawing forming part hereof and in which Figure 1 is an elevational view of metal picker mechanism embodying features of the invention and showing the parts in position for normal operation.

Fig. 2 is a view of a part of the device shown in Fig. 1 illustrating the position of the elements in abnormal position, and Fig. 3 is a cross-sectional view taken on the line 3—3 of Fig. 1.

In the drawing 1 is a shank grooved as at 2 and oscillatable about a fixed axis 3. The axis 3 is fixed in respect to the loom and may be provided thereon or on a part connected therewith. The shank 1 is of metal and is provided with a bracket 4. 5 is a catch and it is pivoted to the shank 1 or to an ear thereon as at 6. The catch is provided with a projecting lever 7. The catch is also provided with a beveled or wedge shaped nose or detent 8. 9 is a spring interposed between the lever 7 and bracket 4, and it is shown as fastened to the bracket by an eye 10 and to the lever 7 by a loop 11 adjustable in a series of notches formed therein. The spring is a tension spring and it is adapted to turn or tend to turn the lever 7 in counterclockwise direction. 12 is a metal picker arm tongued as at 13 to enter the groove 2, and it is pivoted to the free end of the shank, or more accurately to ears thereon as at 14. The picker arm is provided at its inner end with a beveled or wedge shaped heel or trigger element 15 adapted to be caught by the beveled nose 8 of the catch 7 and to act after the manner of a trigger element to release the catch.

With the parts in the position shown in Fig. 1 the picker mechanism as a whole oscillates about the axis 3, and a pair of such mechanisms drive the shuttles back and forth. Should, however, the arm 12 encounter resistance beyond the limit of its normal blows, the arm, turning by reason of such resistance on the pivot 14, will release the catch and permit the arm and the shank to turn in relation to each other with the shank connected at its axis 3 and with the shank and arm connected by the pivot 14, so that all the parts remain connected. Upon the removal of the resistance, the parts of the picker mechanism are reset from the broken position in Fig. 2 to the normal position in Fig. 1.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. Picker stick mechanism comprising a grooved metal shank oscillatable about a fixed axis and provided with a bracket, a catch pivoted to the shank and having a beveled nose and a projecting lever, a spring interposed between the lever and bracket, and a tongued metal picker arm pivotally connected with the free end of the shank and having a beveled heel adapted to be caught by the catch and to release the catch.

2. Picker stick mechanism comprising a metal shank provided with a bracket, a catch pivoted to the shank and having a beveled nose and a projecting lever, a spring interposed between the lever and bracket, and a metal picker arm pivotally connected with the free end of the shank and having a beveled heel adapted to be caught by the catch and to release the catch.

ELLIS L. FOX, JR.